United States Patent [19]
Iwatsuki et al.

[11] Patent Number: 5,138,906
[45] Date of Patent: Aug. 18, 1992

[54] SHIFT CONTROL SYSTEM, AND PROCESS FOR AUTOMATIC TRANSMISSIONS

[75] Inventors: Kunihiro Iwatsuki; Hiromichi Kimura, both of Toyota, Japan

[73] Assignee: Toyota Jidosha Kabushiki Kaisha, Toyota, Japan

[21] Appl. No.: 717,513

[22] Filed: Jun. 19, 1991

[30] Foreign Application Priority Data

Jun. 20, 1990 [JP] Japan ................. 2-161939

[51] Int. Cl.⁵ .................................. B60K 41/18
[52] U.S. Cl. ........................... 74/866; 74/878; 364/424.1
[58] Field of Search .......... 74/866, 867, 868, 869, 74/878; 364/424.1

[56] References Cited

U.S. PATENT DOCUMENTS

| | | | |
|---|---|---|---|
| 4,428,258 | 1/1984 | Kubo et al. | 74/867 |
| 4,721,018 | 1/1988 | Harada et al. | 74/866 |
| 4,722,247 | 2/1988 | Shindo et al. | 74/866 |
| 4,722,250 | 2/1988 | Sumiya et al. | 74/868 X |
| 4,727,772 | 3/1988 | Sumiya et al. | 74/867 |
| 4,751,858 | 6/1988 | Iwatsuki | 74/867 |
| 4,843,922 | 7/1989 | Kashibara | 74/866 |
| 4,854,195 | 8/1989 | Moroto et al. | 74/867 |
| 4,856,381 | 8/1989 | Funahashi et al. | 74/867 |
| 4,867,014 | 9/1989 | Sugano | 74/868 |
| 4,889,016 | 12/1989 | Kuwayama et al. | 74/867 X |
| 4,955,256 | 9/1990 | Kashibara et al. | 364/424.1 X |
| 4,967,244 | 10/1990 | Iwatsuki et al. | 364/424.1 |

FOREIGN PATENT DOCUMENTS

| | | |
|---|---|---|
| 61-99745 | 5/1986 | Japan . |
| 61-165050 | 7/1986 | Japan . |
| 62-31741 | 2/1987 | Japan . |
| 62-31754 | 2/1987 | Japan . |
| 64-15560 | 1/1989 | Japan . |
| 1216151 | 8/1989 | Japan . |

*Primary Examiner*—Richard Lorence
*Assistant Examiner*—William O. Trousdell
*Attorney, Agent, or Firm*—Oblon, Spivak, McClelland, Maier & Neustadt

[57] ABSTRACT

A shift control system for an automatic transmission comprises: a first transmission assembly and a second transmission assembly connected in series to each other and individually having frictional engagement elements to be engaged, if subjected to oil pressures, and accumulators for regulating the oil pressures to be applied to the frictional engagement elements, so as to set any one of gear stages by applying the frictional engagement elements of one of the transmission assemblies to shift up the one transmission assembly and by releasing the frictional engagement elements of the other transmission assembly to shift down the other transmission assembly. The shift control system further comprises: a predictor for predicting whether or not the end of the upshift is to be delayed from that of the downshift; and a back pressure controller for boosting up the back pressures of the individual accumulators connected to the frictional engagement elements, simultaneously, on the basis of the fact that the predictor has predicted the delay of the end of the upshift from that of the downshift.

9 Claims, 7 Drawing Sheets

FIG. 3

| SHIFT RANGE | | C1 | C2 | C0 | B0 | B1 | B2 | B3 | F1 | F2 | F0 | A {1ST ASSEMBLY | 2ND ASSEMBLY} |
|---|---|---|---|---|---|---|---|---|---|---|---|---|---|
| P, N | | | | | | | | | | | | | |
| R | | O | O | O | | | | O | | | | RW | LOW |
| D | 1 | O | | O | | | | X | | ◎ | ◎ | 1ST SPEED | LOW |
| | 2 | O | | | O | X | | X | | ◎ | | 1ST SPEED | HIGH |
| | 3 | O | | O | | | O | | ◎ | | ◎ | 2ND SPEED | LOW |
| | 4 | O | | | O | X | O | | ◎ | | | 2ND SPEED | HIGH |
| | 5 | O | O | O | | | O | | | | ◎ | 3RD SPEED | LOW |
| | 6 | O | O | | O | | O | | | | | 3RD SPEED | HIGH |

…

SHIFT CONTROL SYSTEM, AND PROCESS FOR AUTOMATIC TRANSMISSIONS

BACKGROUND OF THE INVENTION

The present invention relates to a system for controlling the shifts of an automatic transmission for vehicles and a process for executing the shifts. More particularly, the present invention relates to a shift control system for an automatic transmission, which is equipped with first and second transmission assemblies connected in series for executing a downshift, for example, in its entirety by shifting down the first transmission assembly to increase the gear ratio thereof and simultaneously shifting up the second transmission assembly to decrease the gear ratio thereof, and a process for executing such shifts.

There is heretofore known an automatic transmission having first and second transmission assemblies connected in series, the former of which is capable of effecting three-stage shifts of first to third speeds and the latter of which is capable of effecting two higher and lower shift stages. The automatic transmission of this kind can be set to totally six gear stages by switching the second transmission assembly to the higher and lower stages for each gear stage of the first transmission assembly.

In the shifts between those six gear stages or the shifts between the predetermined gear stages selected from the six stages, some shift is achieved by shifting up one of the first and second transmission assemblies and shifting down the other transmission assembly. In other words, the first and second transmission assemblies may be shifted in opposite directions to each other to execute the shift. In this case, the individual shifts are not timed if the transmission assemblies are individually controlled. Then, the driving feel is deteriorated by an increase in the shifting shocks, by an upshift at the second transmission assembly after a downshift at the first transmission assembly, or by a downshift at the first transmission assembly after an upshift at the second transmission assembly.

In order to eliminate such disadvantages, there has been heretofore proposed the following sequential control in case the automatic transmission is to be shifted up in its entirety by shifting the first and second transmission assemblies in opposite directions to each other. In the sequential control, a shift at the transmission assembly for shifts having a small change in the gear ratios is ended while a shift at the transmission assembly for shifts having a high change in the gear ratios. In case the first and second transmission assemblies are to be shifted in the opposite directions, there has also been proposed a shift control which has its shift ending points set coincident at each transmission assembly, as exemplified by Japanese Patent Laid-Open No. 31754/1987. According to this disclosure, after a command signal for an upshift at one transmission assembly has been outputted, a command signal for a downshift at the other transmission assembly is outputted simultaneously as the start of the actual upshift is detected. Moreover, the shifts at the individual transmission assemblies are simultaneously ended by controlling the application pressures of the frictional engagement elements of the transmission assembly to be shifted down, that is, by controlling the drains of the oil pressures from the frictional engagement elements.

In order to execute a high-grade sequential control for synchronizing the ends of the shifts at the individual transmission assemblies, however, the fluctuations of the engine torque or the various dispersions in the automatic transmission cannot be coped with merely by controlling the application pressures of the frictional engagement elements in one transmission assembly. Thus, there arises a problem that a discrepancy is inevitably caused at the end of the shifts of the individual transmission assemblies.

Here, the application pressures of the frictional engagement elements of each transmission assembly could be individually controlled by providing the transmission assembly with a linear solenoid valve. Then, there arises another problem that the weight and production cost are invited by the increased number of control devices.

SUMMARY OF THE INVENTION

A major object of the present invention is to synchronize the ends of shifts of first and second transmission assemblies easily with a simple system in case an automatic transmission is shifted in its entirety by shifting the two transmission assemblies in opposite directions to each other.

Another object of the present invention is to synchronize the ends of the shifts of the individual transmission assemblies without being influenced by the various dispersions, in case the automatic transmission is shifted in its entirety by shifting the two transmission assemblies in opposite directions to each other.

Still another object of the present invention is to provide a control system for synchronizing the ends of the shifts of the first and second transmission assemblies by controlling the back pressures of accumulators connected to the frictional engagement elements of the first and second transmission assemblies.

According to the present invention, the above-specified objects can be achieved by the shift control system for an automatic transmission comprising: a first transmission assembly and a second transmission assembly connected in series to each other and individually having frictional engagement elements to be engaged, if subjected to oil pressures, and accumulators for regulating the oil pressures to be applied to the frictional engagement elements, so as to set any one of gear stages by applying the frictional engagement elements of one of the transmission assemblies to shift up the one transmission assembly and by releasing the frictional engagement elements of the other transmission assembly to shift down the other transmission assembly, wherein the improvement comprises: prediction means for predicting whether or not the end of the upshift is to be delayed from that of the downshift; and back pressure control means for boosting up the back pressures of the individual accumulators connected to the frictional engagement elements, simultaneously, on the basis of the fact that the prediction means has predicted the delay of the end of the upshift from that of the downshift.

According to the present invention, those individual objects can also be achieved by the shift control process for an automatic transmission comprising: a first transmission assembly and a second transmission assembly connected in series to each other and individually having frictional engagement elements to be engaged, if subjected to oil pressures, and accumulators for regulating the oil pressures to be applied to the frictional engagement elements, so as to set any one of gear stages by applying the frictional engagement elements of one of the transmission assemblies to shift up the one transmission assembly and by releasing the frictional engagement elements of the other transmission assembly to shift down the other transmission assembly, wherein the improvement comprises: the step of predicting whether or not the end of the upshift is to be delayed from that of the downshift; and the step of boosting up the back pressures of the individual accumulators connected to the frictional engagement elements, simultaneously, if the delay of the end of the upshift from that of the downshift is predicted.

The above and further objects and novel features of the present invention will more fully appear from the following detailed description when the same is read in connection with the accompanying drawings. It is to be expressly understood, however, that the drawings are for purpose of illustration only and is not intended as a definition of the limits of the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a clutch and brake application chart enumerating the application/release states of frictional engagement means for setting individual gear stages in the automatic transmission shown in FIG. 2;

DETAILED DESCRIPTION OF THE PREFERRED EMBODIMENTS

Figure 1:
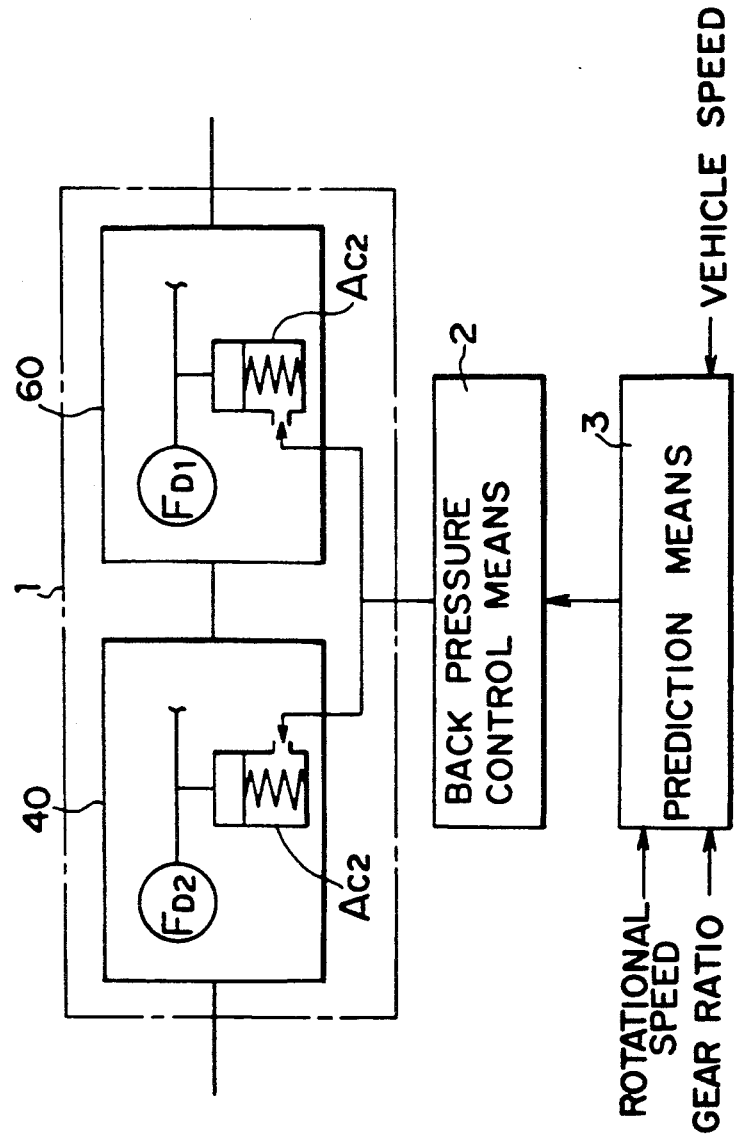
FIG. 1 is a block diagram showing the gist of the present invention.

First of all, the fundamental structure will be described in the following. In FIG. 1, an automatic transmission 1 is equipped with a first transmission assembly 60 capable of setting a plurality of forward gear stages and a reverse gear stage, and a second transmission assembly 40 capable of switching two high and low gear stages. These transmission assemblies 60 and 40 are adapted to change the shifts by engaging or releasing frictional engagement elements FD1 and FD2 such as clutches or brakes hydraulically. These frictional engagement element FD1 and FD2 are connected with accumulators AC1 and AC2 which are equipped with back pressure chambers.

In order to control the progress of the shift at each transmission assembly 60 or 40, there are provided back pressure control means 2 for controlling the back pressures of the accumulators AC1 and AC2, and prediction means 3 for predicting the timing of ending the shift at the transmission assembly 60 or 40. The shifts to be controlled by those means 2 and 3 is exemplified by one, in which the automatic transmission 1 is shifted down in its entirety by engaging the frictional engagement element FD2 of the second transmission assembly 40 to shift up the second transmission assembly 40 and by releasing the frictional engagement element FD1 of the first transmission assembly 60 to shift down the first transmission assembly 60. In this case, the prediction means 3 predicts it on the basis of the rotational speeds of the individual frictional engagement elements FD1 and FD2, the vehicle speed and the gear ratio of the (not-shown) planetary gear set of the first transmission assembly 60 whether or not the upshift of the second transmission assembly 40 is ended earlier than the downshift of the first transmission assembly 60. If it is predicted that the upshift is ended earlier, the prediction means 3 outputs a signal to the back pressure control means 2. This back pressure control means 2 operates to boost the back pressures of the individual accumulators AC1 and AC2 so that the oil pressures of the individual frictional engagement elements FD1 and FD2 change rather highly in the shift transitions. As a result, the second transmission assembly 40 for effecting an upshift by engaging the frictional engagement elements FD1 and FD2 has its frictional engagement element FD2 takes an accelerated shift progress because its frictional engagement element FD2 has its torque capacity increased. On the contrary, the first transmission assembly 60 for effecting a downshift by releasing the frictional engagement element FD1 takes a decelerated shift progress because its frictional engagement element FD1 has its torque capacity delayed to decrease. As a result, the upshift of the second transmission assembly 40 will never precede the downshift of the first transmission assembly 60 so that the output shaft torque can be smoothly augmented to prevent any shifting shock when the automatic transmission 1 is to be shifted down in its entirety.

Figure 2:
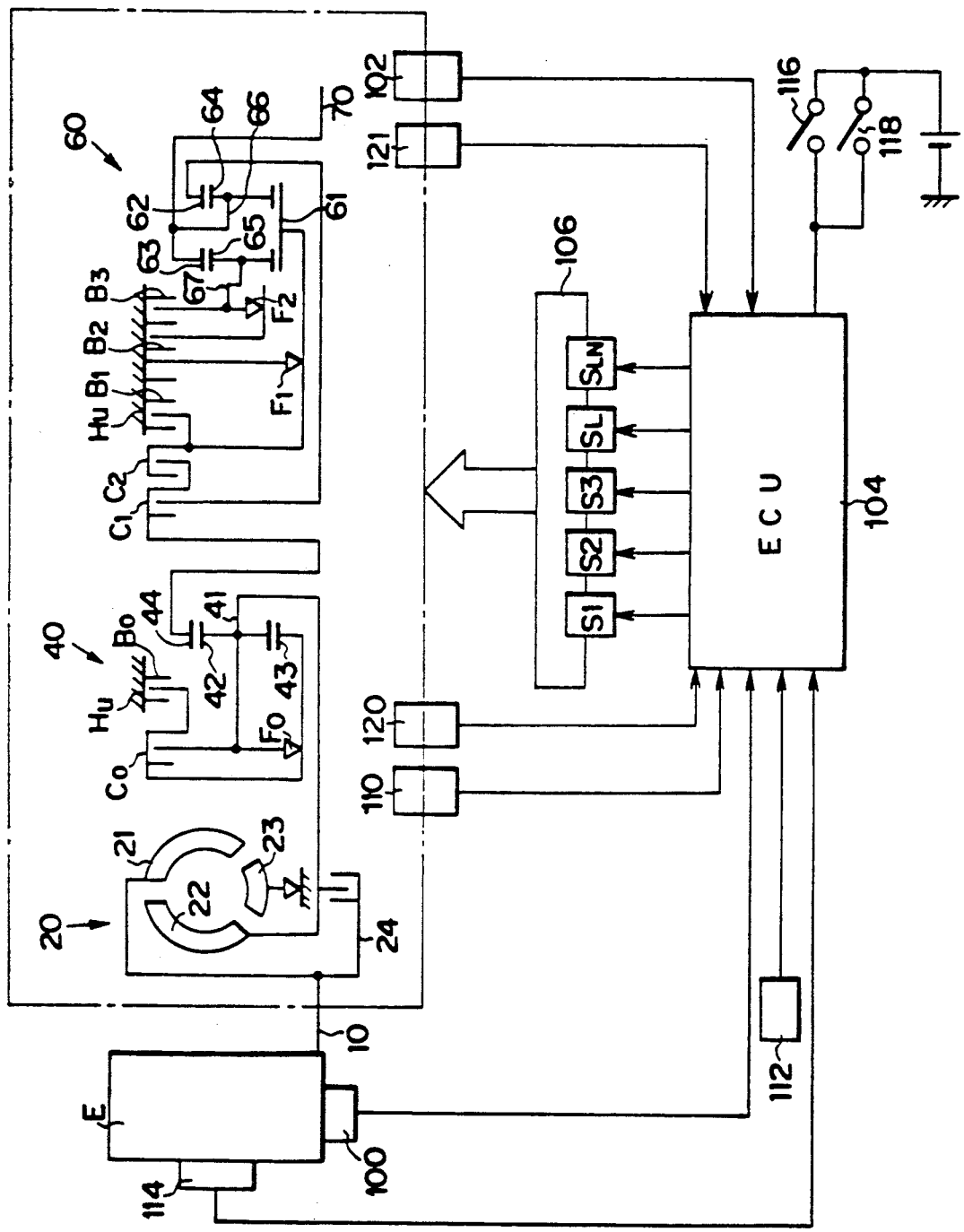
FIG. 2 is a skeleton diagram showing an automatic transmission, into which an embodiment of the present invention is to be incorporated.

FIG. 2 shows a more specific structure. The automatic transmission, as shown, is equipped as its shifting mechanisms with a torque converter 20, the second transmission assembly 40 and the first transmission assembly 60 for achieving three forward and one reverse gear stages.

The torque converter 20 comprises a pump impeller 21, a turbine runner 22, a stator 23 and a lockup clutch 24. The pump impeller 21 is connected to a crankshaft 10 of an engine E, and the turbine runner 22 is connected to a carrier 41 of the planetary gear set in the second transmission assembly 40.

In the second transmission assembly 40, a pinion gear 42 is rotatably supported by that carrier 41 and meshes with a sun gear 43 and a ring gear 44. Between the sun gear 43 and the carrier 41, on the other hand, there are disposed a clutch C0 and a one-way clutch F0, which are arranged in parallel with each other. A brake B0 is interposed between the sun gear 43 and a housing Hu.

The first transmission assembly 60 is equipped with two rows of front and rear planetary gear sets. These planetary gear sets share a sun gear 61 inbetween and are individually equipped with pinion gears 64 and 65, carriers 66 and 67 holding those pinion gears 64 and 65, and ring gears 62 and 63 meshing with the pinion gears 64 and 65.

The ring gear 44 of the second transmission assembly 40 is connected through a clutch C1 to the aforementioned ring gear 62. A clutch C2 is interposed between the aforementioned ring gear 44 and sun gear 61. Moreover, the aforementioned carrier 66 is connected to the aforementioned ring gear 63, and these carrier 66 and ring gear 63 are connected to an output shaft 70. Between the aforementioned carrier 67 and housing Hu, on the other hand, there are interposed a brake B3 and a one-way clutch F2 which are arranged in parallel with each other. Between the sun gear 61 and the housing Hu, there are interposed a one-way clutch F1 and a brake B2 which are arranged in series with each other. A brake B1 is interposed between the sun gear 61 and the housing Hu.

This automatic transmission is equipped with the aforementioned transmission assemblies and an electronic control unit (ECU) 104. This control unit 104 is made receptive of the signals of a throttle opening sensor 100 for detecting the throttle opening reflecting the load state of the engine E and a vehicle speed sensor 102 for detecting the vehicle speed. In response to these signals, the control unit 104 controls solenoid valves S1 to S3, $S_L$ and $S_{LN}$ in a hydraulic control circuit 106 in accordance with a preset shift pattern, so that the individual clutches and brakes may be engaged or released, as indicated at portion B in FIG. 3, to effect the shift controls. In a clutch and brake application chart of FIG. 3: symbols and ⓞ indicate the engaged states; symbols × indicate the engaged states to be taken only at the time of engine braking; and blanks indicate the released states.

Figure 4:
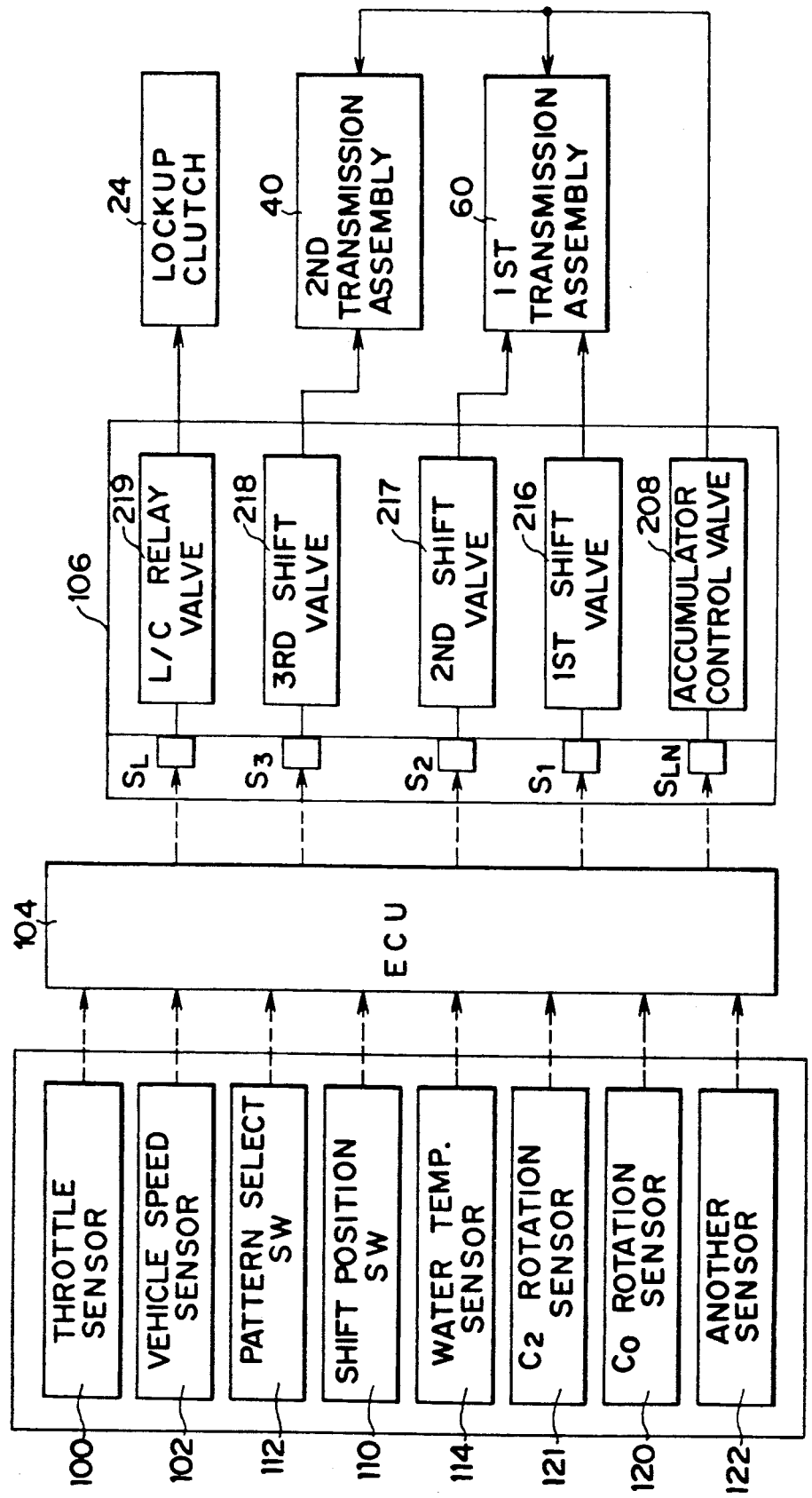
FIG. 4 is a block diagram for explaining a transmission system of control signals in the automatic transmission shown in FIG. 2.

The aforementioned solenoid valves S1 and S2 control a first shift valve 216 and a second shift valve 217 of the first transmission assembly 60, as shown in FIG. 4. The solenoid valve S3 controls a third shift valve 218 for switching the second transmission assembly 40 between and high and low gear stages. The solenoid valve $S_L$ controls a lockup relay valve 219. Moreover, the linear solenoid valve $S_{LN}$ controls the back pressure of the accumulators arbitrarily through an accumulator control valve 208.

In FIGS. 2 and 4, reference numeral 110 designates a shift position sensor for detecting a selected position of a neutral range (N), a drive range (D) and a reverse range (R) to be selected by the driver. Numeral 112 designates a pattern select switch for selecting a shift pattern such as an economy mode (E) or a power mode (P). Numeral 114 designates a water temperature sensor for detecting the temperature of the cooling water of the engine E. Numeral 116 designates a brake switch for detecting the depression of the foot brake. Numeral 118 designates a brake switch for detecting the application of the side brake. Moreover, numeral 120 designates a C0 rotational speed sensor for detecting the rotational speed of the clutch C0. Numeral 121 designates a C2 rotational speed sensor for detecting the rotational speed of the clutch C2. As shown in FIG. 4, moreover, another sensor 122 is connected with the electronic control unit 104.

Figure 5:
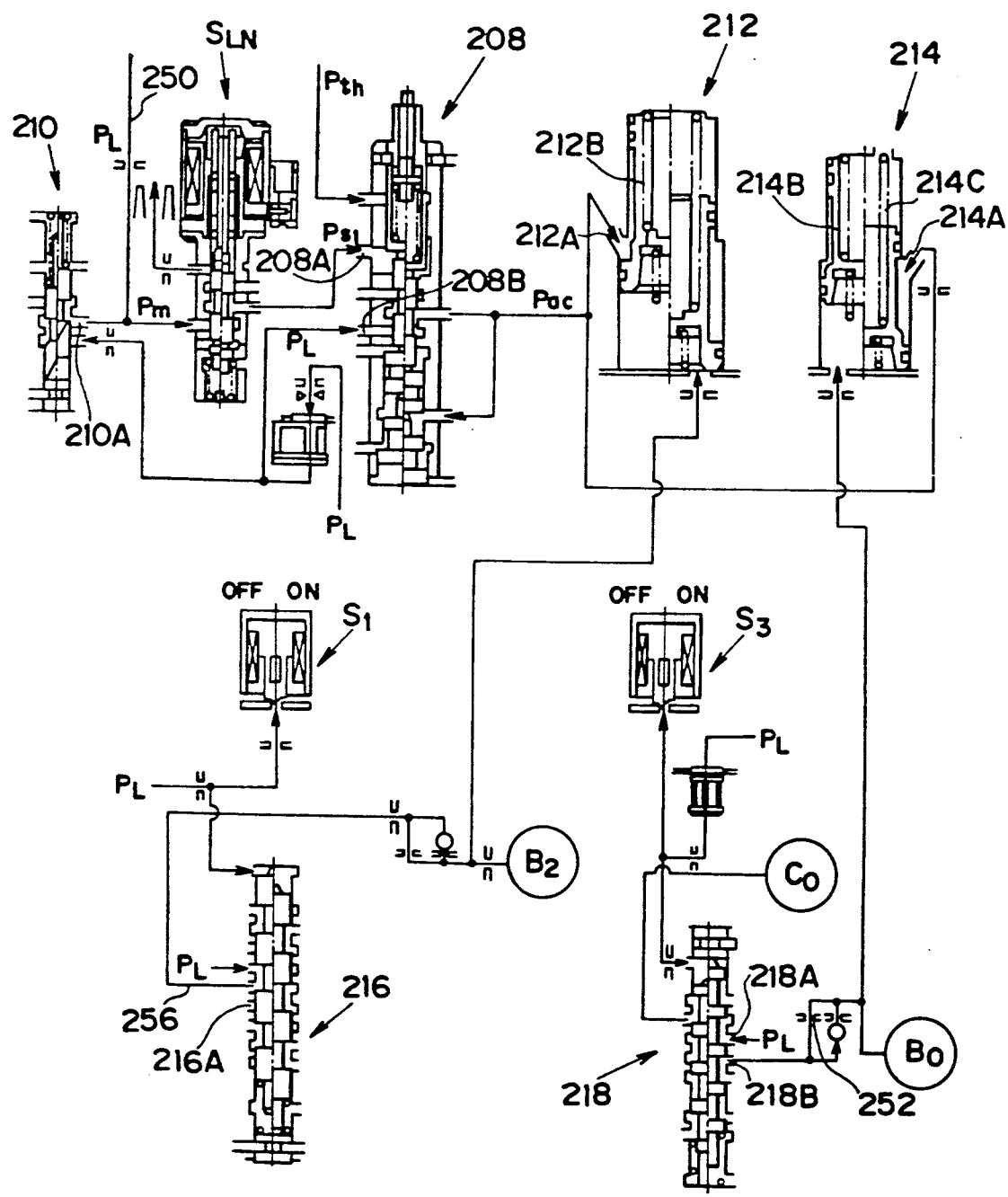
FIG. 5 is a hydraulic circuit diagram showing an essential portion of a hydraulic circuit in the automatic transmission shown in FIG. 2.

FIG. 5 shows an essential portion of the aforementioned hydraulic control circuit 106.

In FIG. 5: reference letters $S_{LN}$ designate the aforementioned linear solenoid valve for controlling the back pressure; numeral 208 the accumulator control valve; numeral 210 a modulator valve; numeral 212 an accumulator for the brake B0; numeral 216 the first shift valve for switching the first transmission assembly 60 to the first or second speeds by the solenoid valve S1; and numeral 218 the third shift valve for switching the second transmission assembly 40 to the high or low gear state by the solenoid valve S3.

A line pressure PL is built up in the known method and applied via an oil passage 250 to a port 210A of the modulator valve 210. In response to the line pressure PL, the modulator valve 210 builds up a predetermined modulator pressure Pm at the same port 210A in the known method.

In response to the modulator pressure, as will be described hereinafter, the linear solenoid valve $S_{LN}$ builds up a solenoid pressure PS1, depending upon the relative progresses of the individual shifts of the first transmission assembly 60 and the second transmission assembly 40.

This solenoid pressure PS1 is inputted to a port 208A of the accumulator control valve 208. The accumulator control valve 208 uses as its input signals a throttle pressure Pth coming from the (not-shown) throttle valve and the solenoid pressure PS1 coming from the linear solenoid valve $S_{LN}$, to regulate the line pressure $P_L$ of a port 208B to an accumulator back pressure Pac.

This accumulator back pressure Pac is put on both a back pressure chamber 212A of the accumulator 212 for the brake B2 and a back pressure chamber 214A of an accumulator 214 for the brake B0.

Here will be described in the following the operations of the case, in which decision of the shift from the third to second speeds is carried out in the electronic control unit 104.

The shift from the third to second speeds is achieved by releasing the brake B2 in the first transmission assembly 60 to shift down the first transmission assembly 60 and by releasing the clutch C0 and applying the brake B0 in the second transmission assembly 40 to shift up the second transmission assembly 40. Therefore, the first description to be made is directed to the control of applying the brake B0. The third shift valve 218 is brought to the lefthand state of the Drawing by the solenoid valve S3. As a result, the line pressure $P_L$ inputted from a port 218A is outputted from a port 218B and is put via an orifice 252 on the brake B0. At this time, the oil is fed not only to the brake B0 but also to the accumulator 214 so that the accumulator 214 starts to have its piston 214B raised. During the rise of this piston 214B, an oil pressure put on PB0 is held under a substantially constant pressure while being balanced by the downward elastic force of a spring 214C and the downward force applied to the piston 214B. This downward force of the piston 214B is established by the accumulator back pressure Pac applied to the back pressure 214A of the accumulator 214. Thus, the transient oil pressure PB0 at the time of applying the brake B0 can be arbitrarily controlled by controlling the accumulator back pressure Pac through the modulator valve 210, the linear solenoid valve $S_{LN}$ and the accumulator control valve 208, as has been described hereinbefore.

As the accumulator back pressure Pac rises, the downward biasing force of the piston 214A is raised to raise the transient oil pressure PB0 to be put on the brake B0, so that the application of the brake B0, i.e., the progress of the upshift of the second transmission assembly 40 is promoted.

If, on the other hand, the shift from the third to second speeds is decided in the electronic control unit 104, the first shift valve 216 is switched to the righthand state of the Drawing by the action of the solenoid valve S1. As a result, an oil passage 256 connected to the brake B2 is connected to the drain port 216A so that the oil is drained from the brake B2. Simultaneously with this, the oil accumulated in the accumulator 212 is drained. In case, however, the accumulator back pressure Pac acting in the back pressure chamber 212A of the accumulator 212 is so high that a piston 212B is pushed down by the strong force, the drainage is accomplished mainly of the oil accumulated in the accumulator 212 so that the oil pressure of the brake B2 is reluctant to drop. As a result, the release of the brake B2, i.e., the progress of the downshift of the first transmission assembly 60 is delayed.

Thus, the rise of the accumulator back pressure Pac functions to guide the progress of the shifts of the first transmission assembly 60 and the second transmission assembly 40 reversely.

Figure 6:
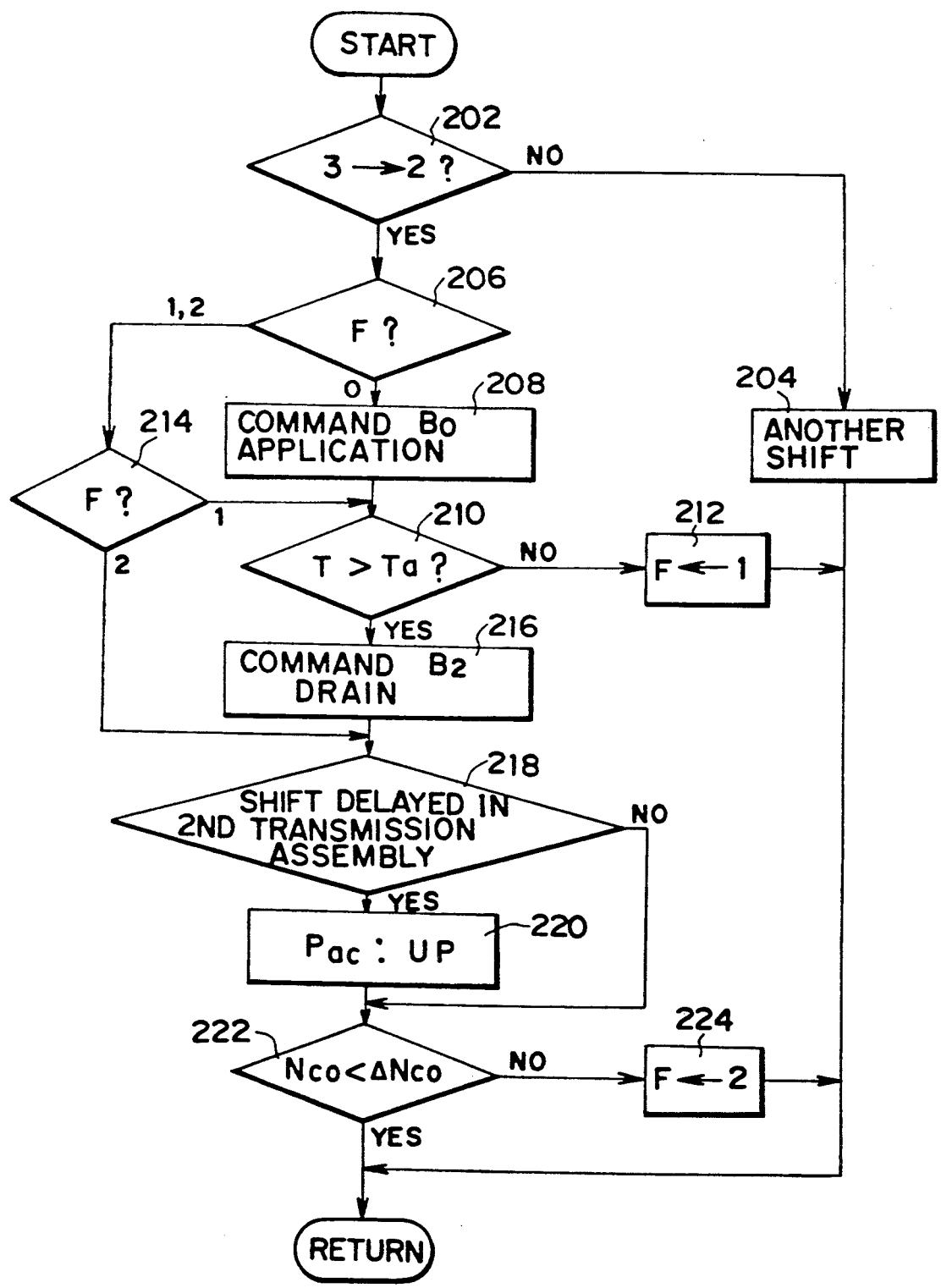
FIG. 6 is a flow chart showing one example of controlling procedures.

FIG. 6 is a flow chart for explaining a control routine to be executed in the system thus constructed. Here will be described an example of the control of a power-on downshift from the third to second speeds.

The downshift from the third to second speeds is achieved, as has been described hereinbefore, by releasing the brake B2 to shift down the first transmission assembly 60 and by applying the brake B0 to shift up the second transmission assembly 40.

First of all, it is decided at Step 202 whether or not the shift from the third to second speeds is a power-on downshift. If NO, the control routine advances to Step 204, at which another shift is executed, and is then returned.

If YES, i.e., if it is decided at Step 202 that the shift is the power-on downshift from the third to second speeds, the routine advances to Step 206, at which a flag F for a program control is decided. Since this flag F is initially reset at 0, the routine advances to Step 208.

At Step 208, a command to put the oil pressure on the brake B0, i.e., a command to switch the application of the solenoid valve S3 is outputted at first. Since the shift being executed is a downshift, its substantial operation has to be started by releasing the brake B2. However, the command to apply the brake B0 is earlier outputted because the application has a far longer time lag than that of the release.

At Step 210, it is decided whether or not a delay time Ta has been elapsed. If NO, the flag F is set to "1" at Step 212, and the routine is returned. After this return, the decision at Step 210 is repeated again through Steps 206 and 214.

Before long, it is decided at Step 210 that the delay time Ta has been elapsed from the instant of outputting the command to apply the brake B0. Then, the routine advances to Step 216, at which a command to release the brake B2, i.e., a command to switch the solenoid valve S1 is outputted.

At Step 218, it is detected how much the shift of the second transmission assembly 40 advances with respect to that of the first transmission assembly 60, to predict whether or not the end of the shift of the second transmission assembly 40 is delayed from that of the shift of the first transmission assembly 60, if the shift advances as it is. Specifically, this prediction is accomplished by deciding whether or not the following formula (1) holds:

$$N_{C0n}/(|N_{C0n}-N_{C0n-1}|) > (N_{0n}/\rho - N_{C2n})/(N_{C2n}-N_{C2n-1}) \quad (1)$$

Here: $N_{C0}$ designates the rotational speed of the clutch C0; $N_{C2}$ designates the rotational speed of the clutch C2; and $N_0$ designates the rotational speed of the output shaft. The suffix n designates the value sampled at this time, and the suffix (n−1) designates the value sampled at the previous time. Moreover, letter $\rho$ designates the gear ratio (i.e., the tooth number of the sun gear 61/the tooth number of the ring gear 63) of the planetary gear set of the front side of the first transmission assembly 60.

If the formula (1) holds at Step 218, namely, if it is predicted that the shift end of the second transmission assembly 40 will be delayed as it is, the routine advances to Step 220, at which the linear solenoid valve $S_{LN}$ is controlled to boost up the accumulator back pressure Pac to a predetermined level. Incidentally, the correction of the accumulator back pressure Pac in this embodiment is accomplished only in the boosting direction so as to simplify the controls. Therefore, such an initial value of the accumulator back pressure Pac as will depend upon the throttle opening is set at a slightly low level.

At Step 222, it is decided whether or not the shift of the second transmission assembly 40 has been ended. This decision is accomplished by deciding whether or not the present rotational speed $N_{C0}$ of the clutch C0 is smaller than a constant $\Delta N_{C0}$. If NO, i.e., if the shift of the second transmission assembly 40 is not ended yet, the routine advances to Step 224, at which the flag F is set at "2", and the controls on and after Steps 218 are repeated through Steps 206 and 214. The boost of the accumulator pressure Pac is repeatedly executed till the end of the shift of the second transmission assembly 40, so long as it is predicted at Step 218 that the shift end of the second transmission assembly 40 will be delayed from that of the first transmission assembly 60. By boosting the accumulator back pressure Pac, moreover, the upshift (i.e., the application of the brake B0) of the second transmission assembly 40 is accelerated, as has been described hereinbefore. Simultaneously with this, the downshift (i.e., the release of the brake B2) of the first transmission assembly 60 is delayed to correct the unbalance of the shift progress.

All the controls of the routine are ended when it is decided at Step 222 that the shift of the second transmission assembly 40 has been ended.

Figure 7A:
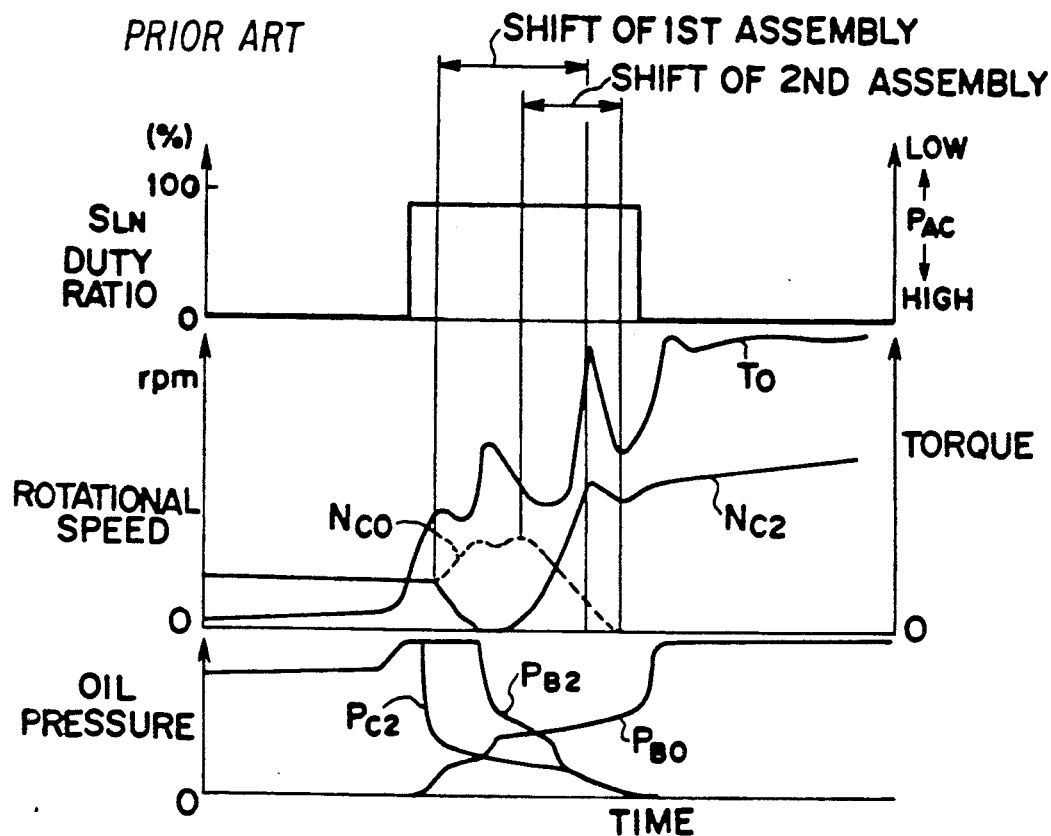
FIG. 7A is a diagram presenting the transient characteristics of the shifts of the prior art.
Figure 7B:
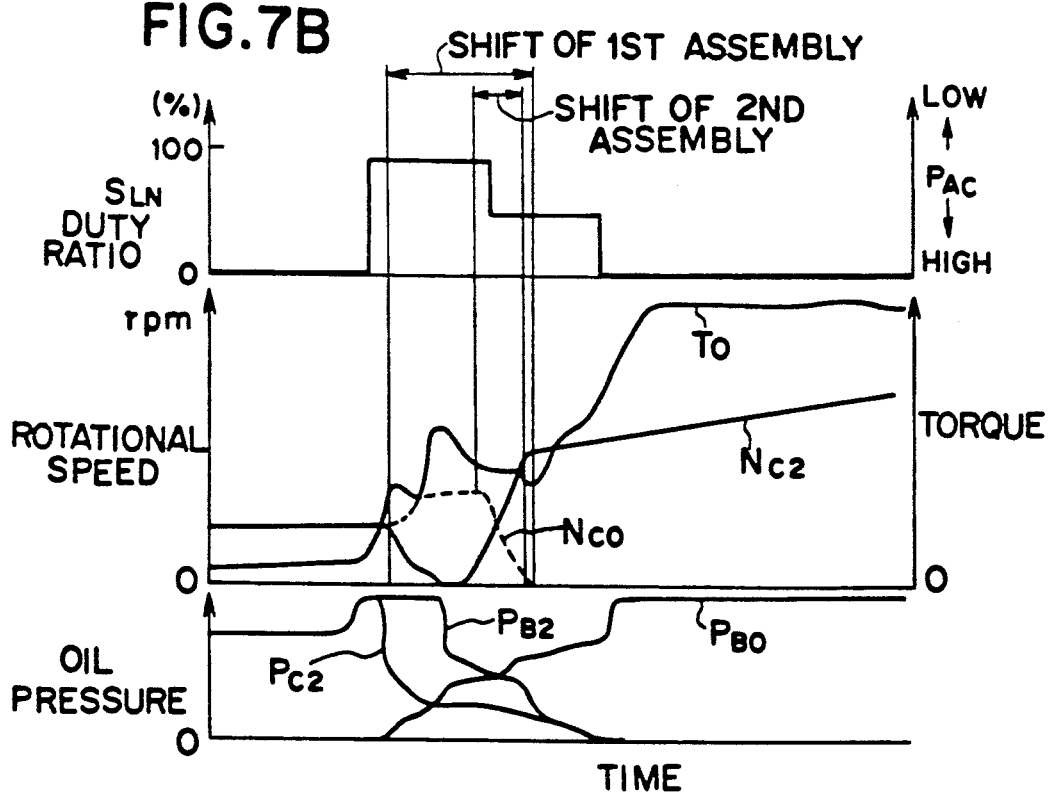
FIG. 7B is a diagram presenting the transient characteristics of the shifts according to the present invention.

FIG. 7A presents the shifting characteristics of the prior art, and FIG. 7B presents the shifting characteristics of the embodiment thus far described. In these graphs, there are plotted the power-on downshift characteristics from the third to second speeds at a low vehicle speed near 30 Km/hour.

Since, in the controls of the prior art, the shifting time itself of the first transmission assembly 60 is short especially in such low speed range, it is not easy to start and complete the upshift of the second transmission assembly 40 during the downshift of the first transmission assembly 60. As shown, an overshoot of an output shaft torque T0 is caused by the delay in the shift end of the second transmission assembly 40.

In the control of the aforementioned embodiment, on the contrary, this delayed state is detected to boost up the accumulator back pressure Pac so that the shift of the second transmission assembly 40 is advanced whereas the shift of the first transmission assembly 60 is delayed. As a result, the shift of the second transmission assembly 40 can be reliably completed during the shift of the first transmission assembly 60 to afford excellent shifting characteristics.

Here will be synthetically described the advantages to be attained by the present invention. In case, according to the present invention, a specific shift is to be achieved by shifting the individual transmission assemblies in the opposite directions, the shifting progresses of the first and second transmission assemblies can be moved in a desired direction merely by controlling the accumulator back pressure with the back pressure control means so that the shift ends of the individual transmission assemblies can be synchronized irrespective of various dispersions. As a result, there can be attained advantages that the shifting characteristics are improved and that the mechanism for practicing the system is simplified.

What is claimed is:

1. A shift control system for an automatic transmission comprising: a first transmission assembly and a second transmission assembly connected in series to each other and individually having frictional engagement elements to be engaged, if subjected to oil pressures, and accumulators for regulating the oil pressures to be applied to said frictional engagement elements, so as to set any one of gear stages by applying the frictional engagement elements of one of said transmission assemblies to shift up said one transmission assembly and by releasing the frictional engagement elements of the other transmission assembly to shift down said other transmission assembly, wherein the improvement comprises:

prediction means for predicting whether or not the end of said upshift is to be delayed from that of said downshift; and back pressure control means for boosting up the back pressures of the individual accumulators connected to said frictional engagement elements, simultaneously, on the basis of the fact that said prediction means has predicted the delay of the end of said upshift from that of said downshift.

2. A shift control system according to claim 1, wherein said back pressure control means includes: a pressure regulating valve capable of having its pressure regulating level changed; and pressure regulating level changing means for changing the pressure regulating level of said pressure regulating valve.

3. A shift control system according to claim 2, wherein said accumulators individually have back pressure chambers connected to said pressure regulating valve via a common oil passage.

4. A shift control system according to claim 3, wherein said pressure regulating valve has a spool for regulating the oil pressure according to a load, which acts to push said spool in one direction of the axial direction of said spool, by applying the oil pressure against said load.

5. A shift control system according to claim 4, wherein said pressure regulating level changing means is a solenoid valve for applying the oil pressure against said load to said pressure regulating valve.

6. A shift control system according to claim 5, wherein said solenoid valve is a linear solenoid valve for establishing a pressure changing with a current value.

7. A shift control system according to claim 1, wherein said prediction means predicts the delay of the end of said upshift from that of said downshift on the basis of the change in the rotational speed of each of said frictional engagement elements.

8. A shift control process for an automatic transmission comprising: a first transmission assembly and a second transmission assembly connected in series to each other and individually having frictional engagement elements to be engaged, if subjected to oil pressures, and accumulators for regulating the oil pressures to be applied to said frictional engagement elements, so as to set any one of gear stages by applying the frictional engagement elements of one of said transmission assemblies to shift up said one transmission assembly and by releasing the frictional engagement elements of the other transmission assembly to shift down said other transmission assembly, wherein the improvement comprises:

the step of predicting whether or not the end of said upshift is to be delayed from that of said downshift; and the step of boosting up the back pressures of the individual accumulators connected to said frictional engagement elements, simultaneously, if the delay of the end of said upshift from that of said downshift is predicted.

9. A shift control process according to claim 8, wherein the prediction of whether or not the end of said upshift is delayed from that of said downshift is based upon a change in the rotational speed of each of said frictional engagement elements.

* * * * *